(12) United States Patent
Burrow

(10) Patent No.: US 11,872,536 B2
(45) Date of Patent: Jan. 16, 2024

(54) MIXING BOWL TILTING ASSEMBLY

(71) Applicant: Amy Burrow, Mansfield, TX (US)

(72) Inventor: Amy Burrow, Mansfield, TX (US)

( * ) Notice: Subject to any disclaimer, the term of this patent is extended or adjusted under 35 U.S.C. 154(b) by 357 days.

(21) Appl. No.: 17/382,090

(22) Filed: Jul. 21, 2021

(65) Prior Publication Data

US 2023/0022408 A1 Jan. 26, 2023

(51) Int. Cl.
*B01F 15/02* (2006.01)
*B01F 15/00* (2006.01)
*F16M 11/26* (2006.01)
*F16M 11/10* (2006.01)
*B01F 35/75* (2022.01)
*B01F 35/43* (2022.01)

(52) U.S. Cl.
CPC .......... *B01F 35/7548* (2022.01); *B01F 35/43* (2022.01); *F16M 11/10* (2013.01); *F16M 11/26* (2013.01); *F16M 2200/028* (2013.01); *F16M 2200/08* (2013.01)

(58) Field of Classification Search
CPC ..... B01F 35/7548; B01F 35/43; F16M 11/10; F16M 11/26; F16M 2200/028; F16M 2200/08
See application file for complete search history.

(56) References Cited

U.S. PATENT DOCUMENTS

| | | | |
|---|---|---|---|
| 2,708,558 A | 5/1955 | Pedersen | |
| 2,813,693 A | 11/1957 | Puddicombe | |
| 4,048,473 A * | 9/1977 | Burkhart | A47J 27/004 219/521 |
| 4,106,118 A | 8/1978 | Hoover | |
| 4,173,925 A | 11/1979 | Leon | |
| 4,301,717 A * | 11/1981 | Knees | A47J 27/14 99/348 |
| 4,450,758 A * | 5/1984 | Belinkoff | A47J 37/047 99/332 |
| 5,107,096 A * | 4/1992 | Knees | A47J 27/004 D7/354 |
| 5,299,768 A | 4/1994 | Berry | |
| D364,546 S | 11/1995 | Tieffel | |
| 5,613,774 A * | 3/1997 | Chandra | A47J 27/04 99/348 |
| 5,626,073 A * | 5/1997 | Bauer | B65G 7/08 99/348 |
| 6,374,727 B1 * | 4/2002 | Cretors | A23L 7/187 99/348 |

(Continued)

FOREIGN PATENT DOCUMENTS

WO WO2015134963 9/2015

*Primary Examiner* — Donnell A Long

(57) ABSTRACT

A mixing bowl tilting assembly includes a support frame that can be positioned on a support surface. A pair of uprights is each pivotally coupled to the support frame. Each of the uprights is positionable in a deployed position having each of the uprights being vertically oriented on the support frame. A pair of ratchets is each of the ratchets is integrated into a respective one of the uprights. A mixing bowl is provided and the mixing bowl can pour contents of the mixing bowl when the mixing bowl is tipped. A pair of arms is each pivotally coupled to the bowl and each of the arms engages a respective one of the ratchets. Each of the ratchets rotates when the mixing bowl is tipped to pour the ingredients without requiring a user to support the mixing bowl.

9 Claims, 8 Drawing Sheets

(56) References Cited

U.S. PATENT DOCUMENTS

| | | | | |
|---|---|---|---|---|
| 6,494,610 | B1* | 12/2002 | Brunswick | A21C 1/02 |
| | | | | 366/207 |
| 6,575,337 | B1 | 6/2003 | Malavear | |
| 6,927,366 | B2* | 8/2005 | Sawhney | A47J 37/108 |
| | | | | 99/348 |
| 7,413,102 | B1 | 8/2008 | Borchardt | |
| 7,485,830 | B2* | 2/2009 | Wang | F24C 1/00 |
| | | | | 219/385 |
| 7,901,721 | B2* | 3/2011 | Oosterling | A47J 37/0623 |
| | | | | 99/476 |
| 8,122,815 | B2* | 2/2012 | Wolfe | A47J 43/046 |
| | | | | 99/348 |
| 8,707,862 | B1* | 4/2014 | Oliver | A47J 36/165 |
| | | | | 99/348 |
| 9,693,654 | B2* | 7/2017 | Smith | A47J 36/34 |
| 9,943,087 | B2* | 4/2018 | Cretors | A23P 20/13 |
| 10,441,928 | B2* | 10/2019 | Rigas | B01F 27/2322 |
| 11,198,222 | B2* | 12/2021 | Farid | A47J 27/004 |

* cited by examiner

MIXING BOWL TILTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tilting devices and more particularly pertains to a new tilting device for tilting a mixing bowl without requiring a user to support the mixing bowl. The device includes a stand and a pair of ratchets that are each rotatably integrated into the stand. The device additionally includes a mixing bowl that has a pair of arms which each engages a respective ratchet. The ratchets facilitate the mixing bowl to be tipped to pour ingredients from the mixing bowl without requiring a user to support the mixing bowl.

(2) Description of Related Art Including Information Disclosed Under 37 CFR 1.97 and 1.98

The prior art relates to tilting device including a variety of mixing bowl devices that each includes a stand and a mixing bowl that pivotally engages a pair of pivot points on the stand for tipping the mixing bowl without requiring a user to support the mixing bowl. The prior art discloses a mixing bowl support device for supporting a mixing bowl in an automatic mixing machine.

BRIEF SUMMARY OF THE INVENTION

An embodiment of the disclosure meets the needs presented above by generally comprising a support frame that can be positioned on a support surface. A pair of uprights is each pivotally coupled to the support frame. Each of the uprights is positionable in a deployed position having each of the uprights being vertically oriented on the support frame. A pair of ratchets is each of the ratchets is integrated into a respective one of the uprights. A mixing bowl is provided and the mixing bowl can pour contents of the mixing bowl when the mixing bowl is tipped. A pair of arms is each pivotally coupled to the bowl and each of the arms engages a respective one of the ratchets. Each of the ratchets rotates when the mixing bowl is tipped to pour the ingredients without requiring a user to support the mixing bowl.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
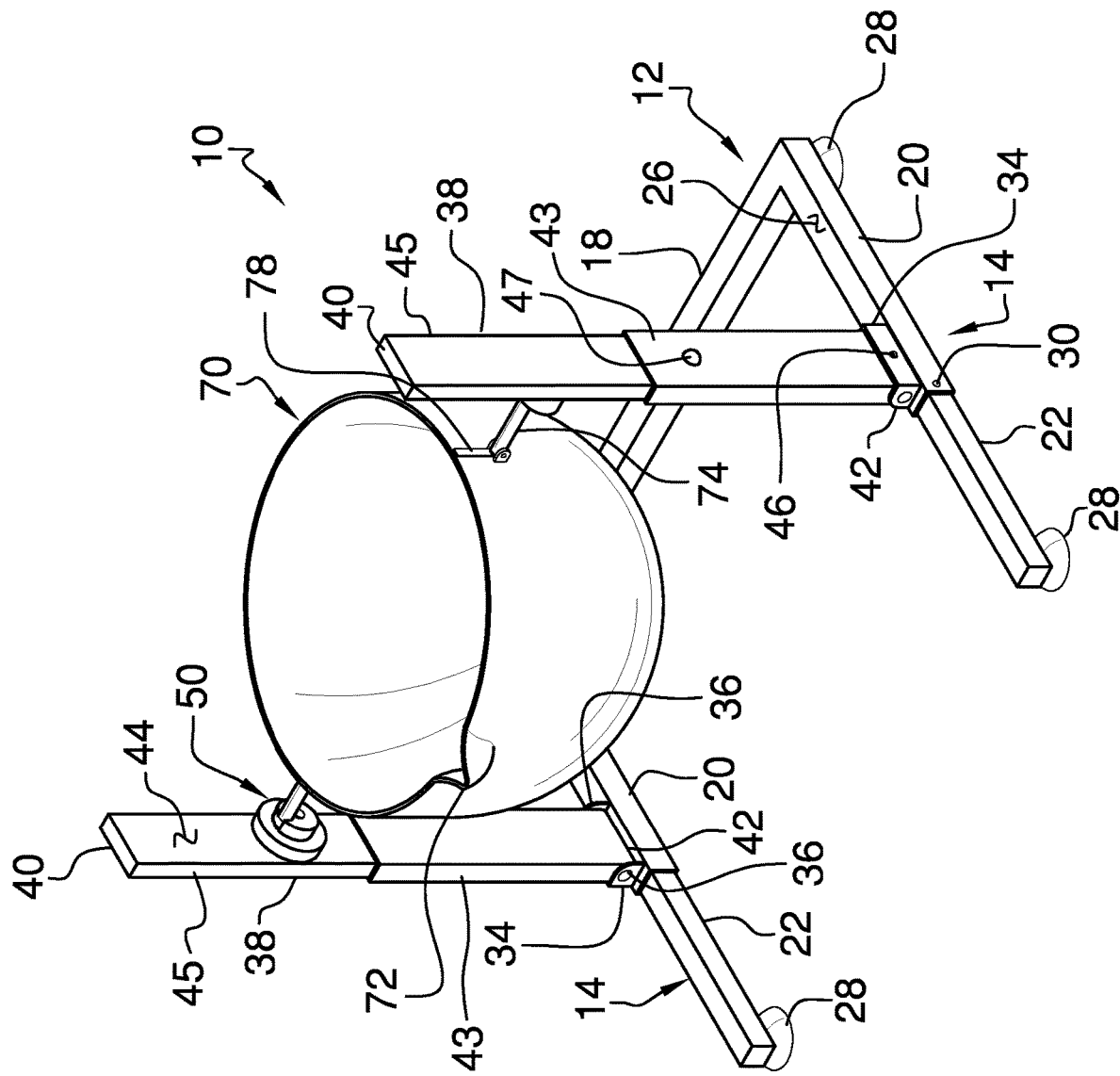
FIG. 1 is a perspective view of a mixing bowl tilting assembly according to an embodiment of the disclosure.
Figure 2:
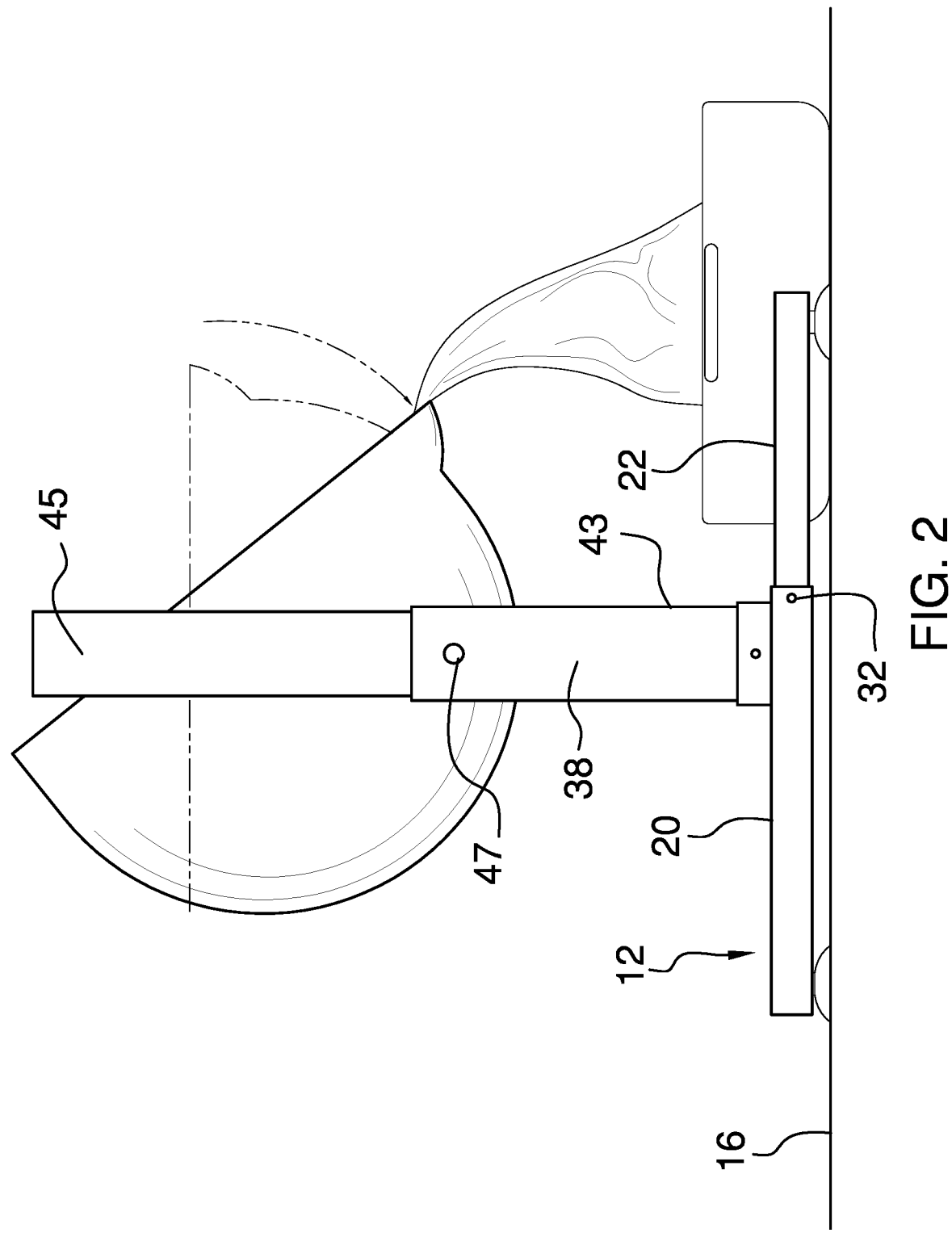
FIG. 2 is a right side in-use view of an embodiment of the disclosure showing a mixing bowl being tipped for pouring ingredients from the mixing bowl.
Figure 3:
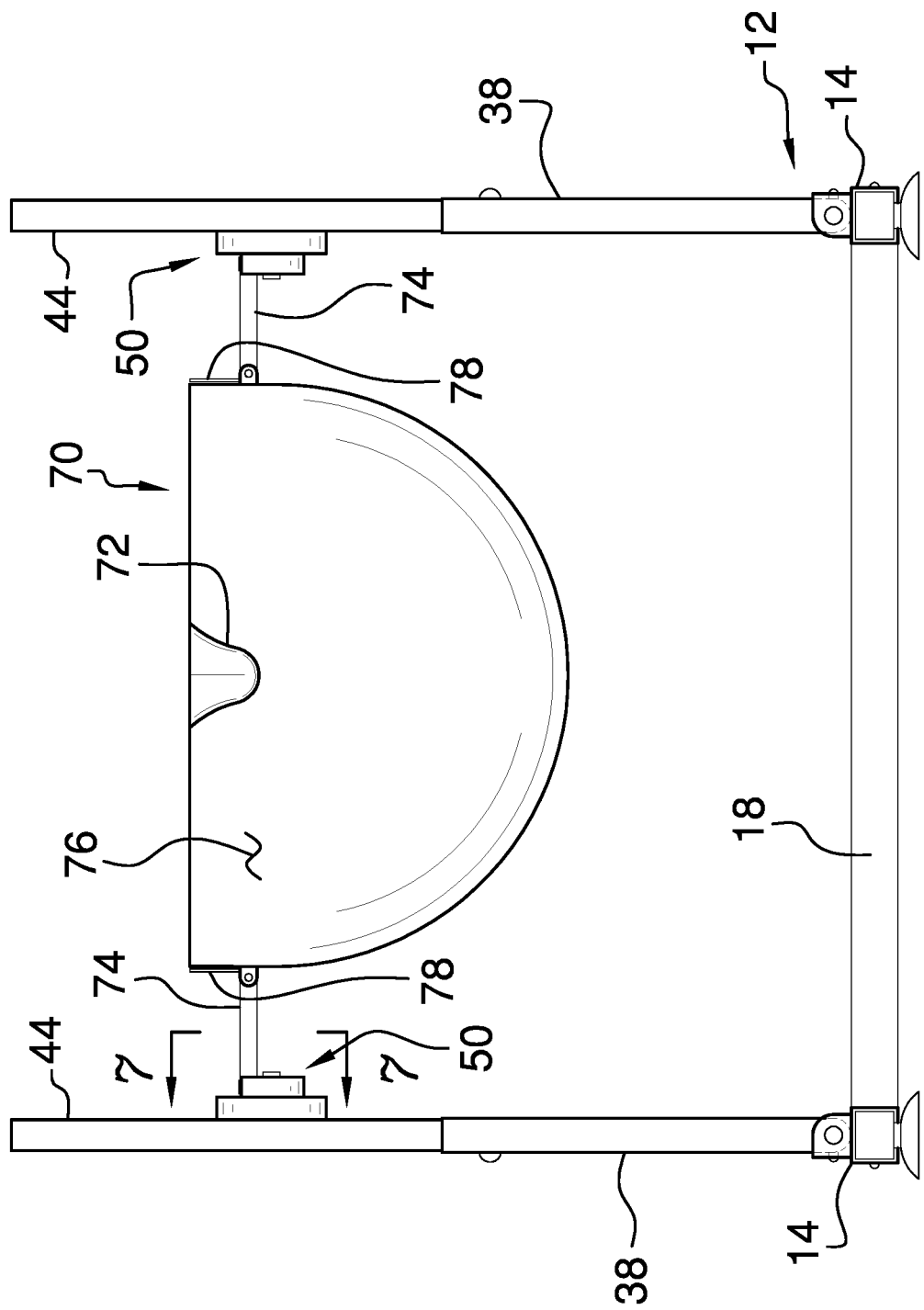
FIG. 3 is a front view of an embodiment of the disclosure.
Figure 4:
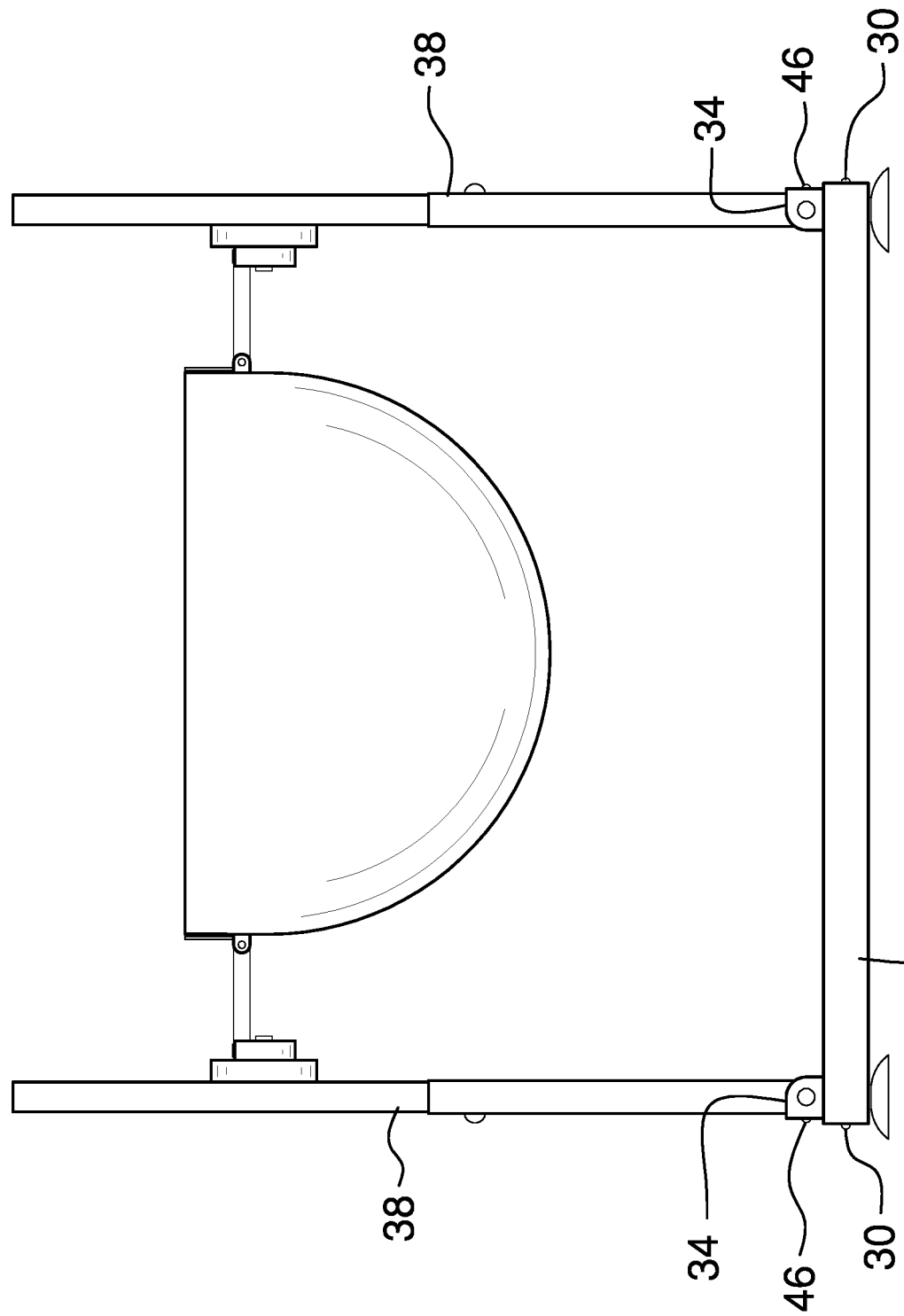
FIG. 4 is a back view of an embodiment of the disclosure.
Figure 5:
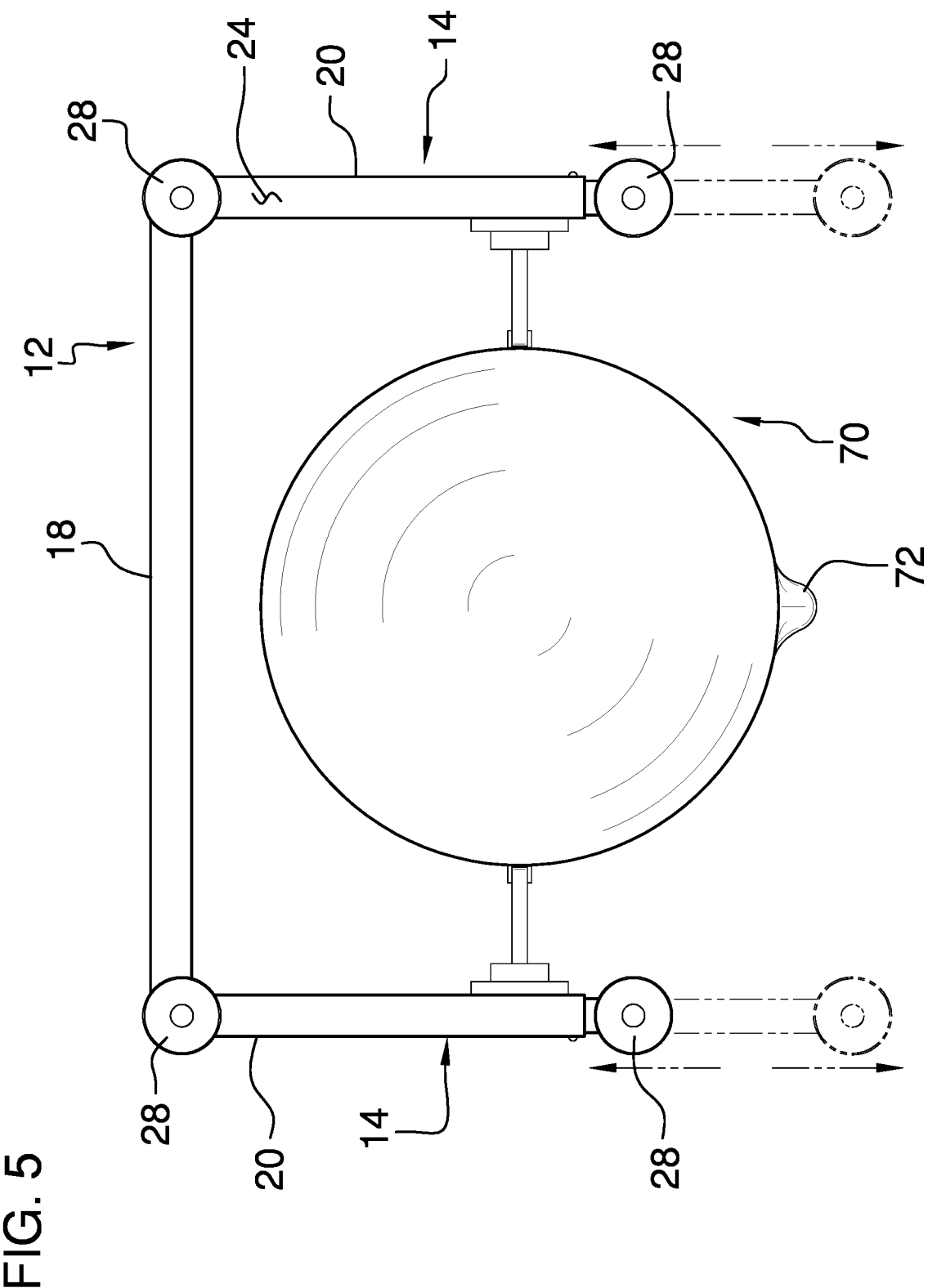
FIG. 5 is a bottom view of an embodiment of the disclosure.
Figure 6:
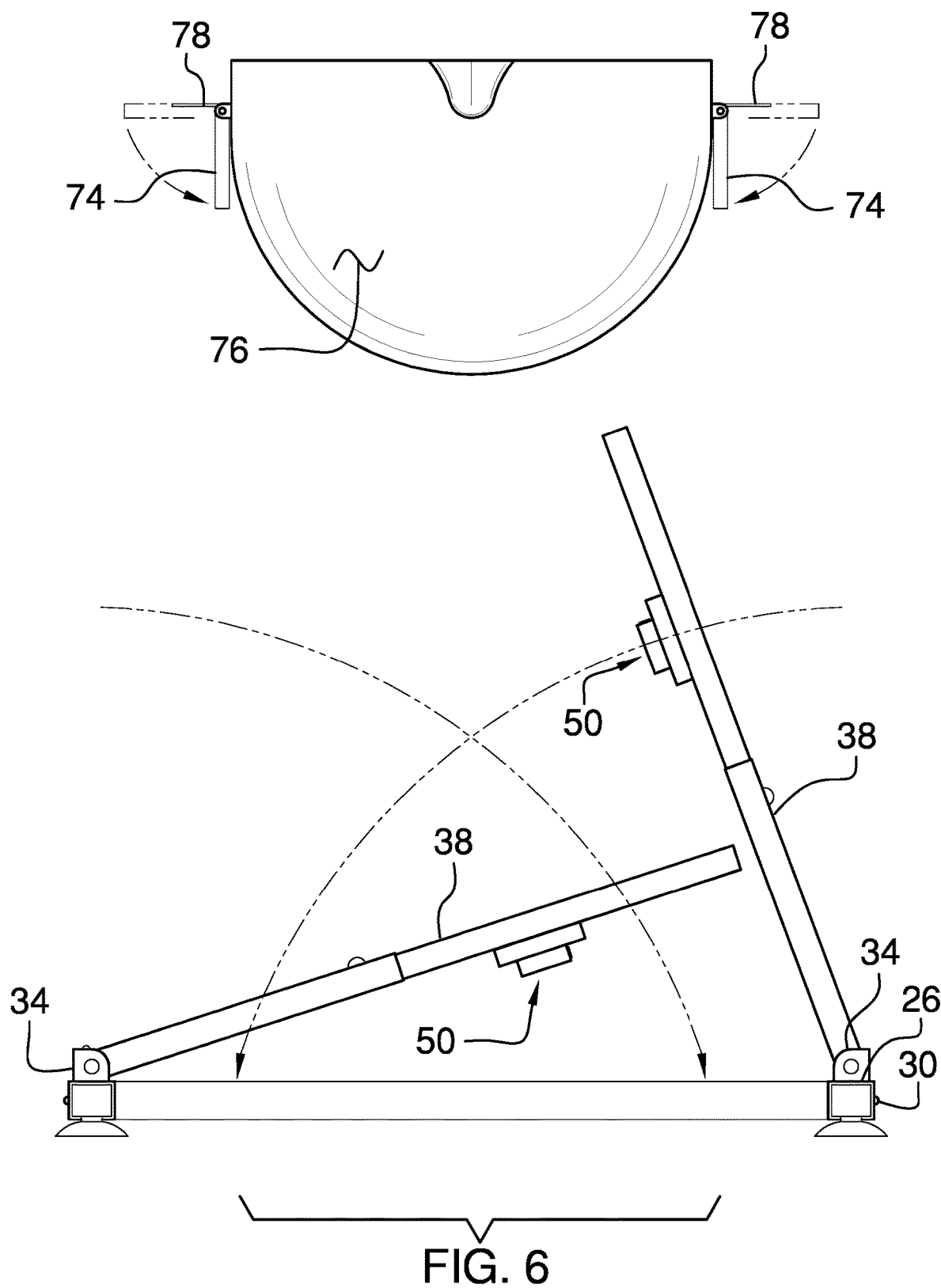
FIG. 6 is an exploded perspective view of an embodiment of the disclosure.
Figure 7:
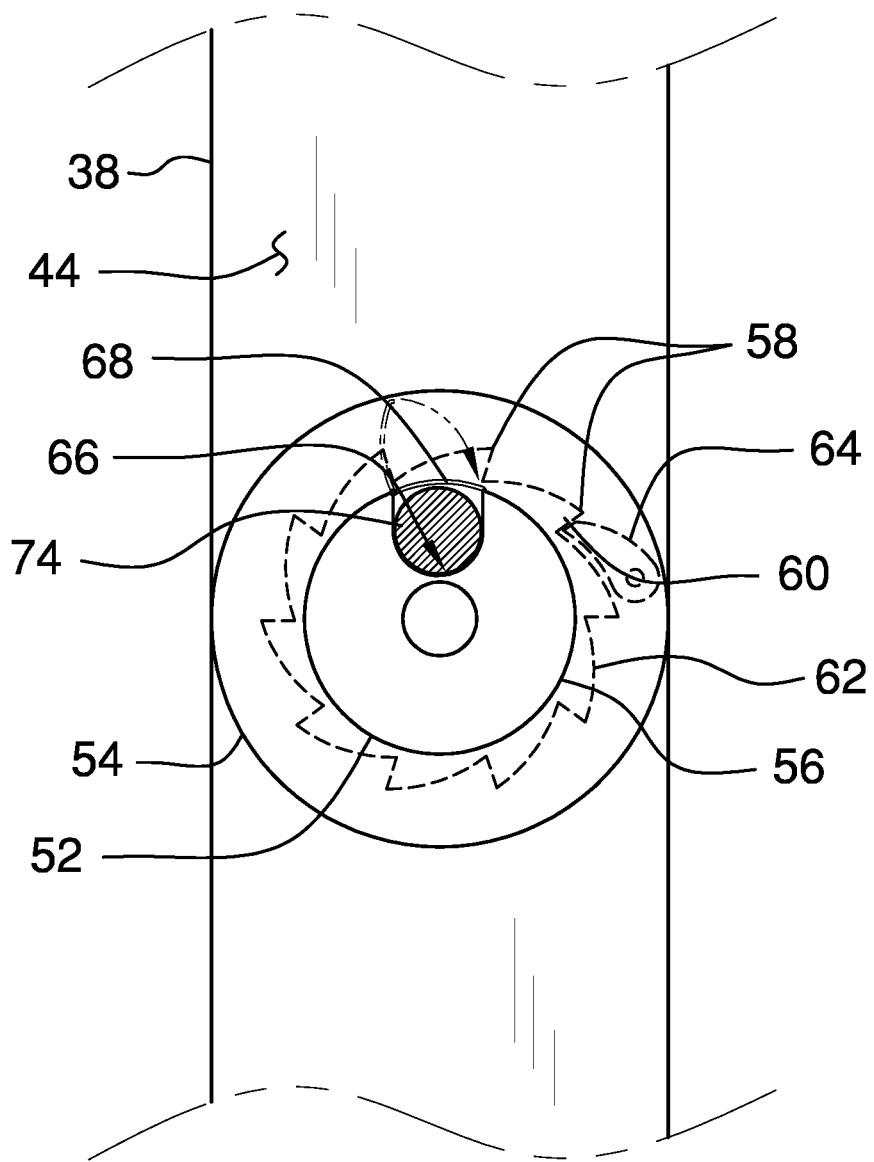
FIG. 7 is a cross sectional view taken along line 7-7 of FIG. 3 of an embodiment of the disclosure.
Figure 8:
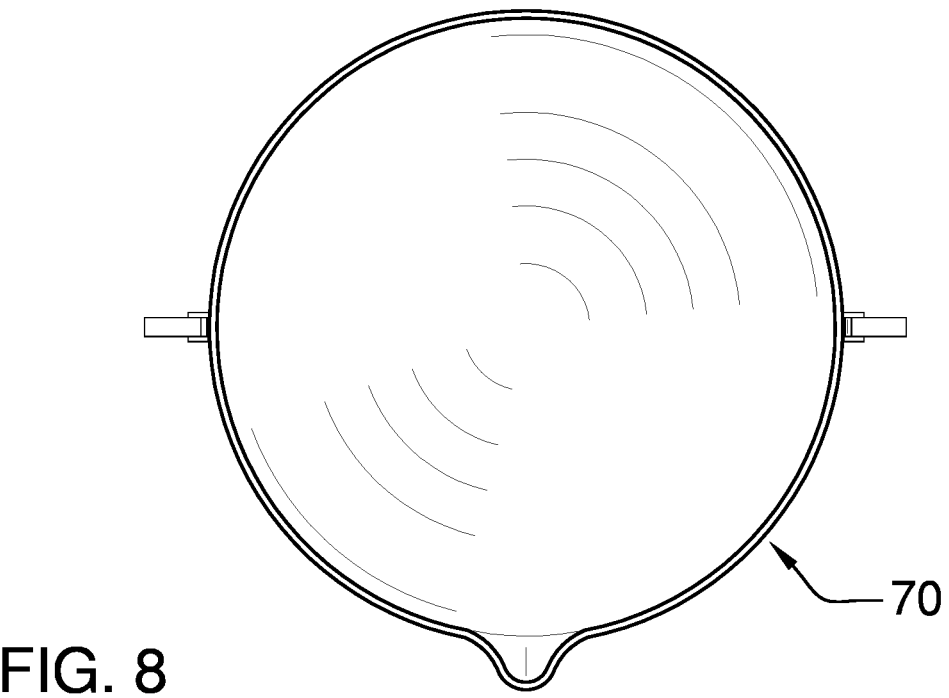
FIG. 8 is a top view of an embodiment of the disclosure showing a large diameter mixing bowl.
Figure 9:
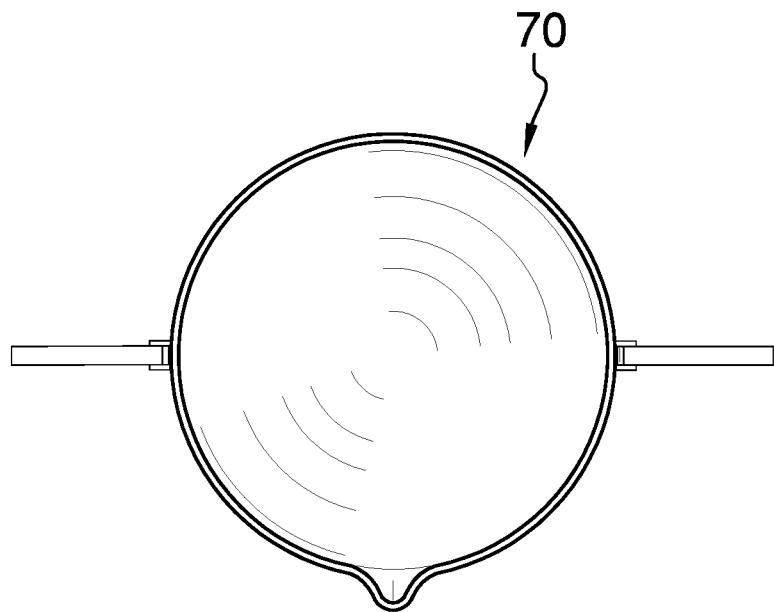
FIG. 9 is a top view of an embodiment of the disclosure showing a small diameter mixing bowl.

With reference now to the drawings, and in particular to FIGS. 1 through 9 thereof, a new tilting device embodying the principles and concepts of an embodiment of the disclosure and generally designated by the reference numeral 10 will be described.

As best illustrated in FIGS. 1 through 9, the mixing bowl tilting assembly 10 generally comprises a support frame 12 which has a pair of legs 14 that each has a telescopically adjustable length. The support frame 12 can be positioned to lie on a support surface 16, such as a table top or other similar horizontal support surface. The support frame 12 includes a member 18 extending between a first portion 20 of each of the legs 14. Additionally, each of the legs 14 includes a second portion 22 which slidably engages the first portion 20 to facilitate the telescopically adjustable length. Each of the legs 14 has a bottom surface 24 and a top surface 26.

A plurality of feet 28 is provided and each of the feet 28 is coupled to the support frame 12 such that each of the feet 28 can abut a support surface 16. Each of the feet 28 is concavely arcuate such that each of the feet 28 defines a bowl and each of the feet 28 is comprised of a deformable material. In this way each of the feet 28 can be compressed against the support surface 16 to suctionally engage the support surface 16. Additionally, each of the feet 28 is positioned on the bottom surface 24 of a respective one of the legs 14.

A pair of leg locks 30 is each movably integrated into the second portion 22 of a respective one of the legs 14. Each of the leg locks 30 is biased outwardly from the second portion 22 of the respective leg 14 and each of the leg locks 30 extends outwardly through a hole 32 in the first portion 20 of the respective leg 14. In this way the second portion 22 of each of the legs 14 can be retained in an extended position. Each of the leg locks 30 is depressible to disengage the hole 32 to facilitate the second portion 22 to be retracted into the first portion 20. A pair of hinges 34 is provided and each of the hinges 34 is coupled to and extends upwardly from the top surface 26 of a respective one of the legs 14. Each of the hinges 34 is positioned on the first portion 20 of the respective leg 14 adjacent to an intersection with the second portion 22 of the respective leg 14. Additionally, each of the hinges 34 has a pair of hinge points 36 that are spaced apart from each other.

A pair of uprights 38 is provided and each of the uprights 38 is pivotally coupled to the support frame 12. Each of the uprights 38 is positionable in a deployed position having each of the uprights 38 being vertically oriented on the support frame 12. Each of the uprights 38 is positionable in a stored position having each of the uprights 38 being horizontally oriented on the support frame 12. Each of the uprights 38 has a top end 40, a bottom end 42 and a first surface 44 extending between the top end 40 and the bottom end 42. The bottom end 42 is positioned in a respective one of the hinges 34 and each of the hinge points 36 on the respective hinge 34 pivotally engages the upright 38 that is positioned in the respective hinge 34. Additionally, the first surface 44 of each of the uprights 38 is directed toward each other when the uprights 38 are in the deployed position.

A pair of upright locks 46 is provided and each of the upright locks 46 is movably integrated into a respective one of the uprights 38. Each of the upright locks 46 is biased outwardly from the respective upright 38. Moreover, each of the upright locks 46 extends through a hole 48 in a respective one of the hinges 34 for retaining the uprights 38 in the deployed position. Each of the upright locks 46 is depressible to disengage the hole 48 in the respective hinge 34 for moving the uprights 38 into the stored position. Each of the uprights 38 comprises a first section 43 that slidably receives a second section 45 such that each of the uprights 38 has a telescopically adjustable height. Additionally, the first section 43 of each of the uprights 38 includes a locking mechanism 47 that engages the second section 45 for retaining the uprights 38 at a selected height.

A pair of ratchets 50 is provided and each of the ratchets 50 is integrated into a respective one of the uprights 38. Each of the ratchets 50 has a central disk 52 that is sequentially rotatable in an outer disk 54. The outer disk 54 of each of the ratchets 50 lies flat on the first surface 44 of a respective one of the uprights 38 having the central disk 52 being directed away from the first surface 44. The central disk 52 has an outer surface 56 and the outer surface 56 has a plurality of teeth 58 each extending outwardly from the outer surface 56. The teeth 58 are spaced apart from each other and are distributed around the outer surface 56, and the teeth 58 are positioned inside of the outer disk 54.

Each of the teeth 58 has a front surface 60 that is oriented perpendicular to the outer surface 56 of the central disk 52. Additionally, each of the teeth 58 has a top surface 62 sloping between the front surface 60 and the outer surface 56 of the central disk 52. Each of the ratchets 50 includes a finger 64 that is pivotally disposed within the outer disk 54. The finger 64 slides along the top surface 62 of each of the teeth 58 when the central disk 52 is rotated in a first direction. Conversely, the finger 64 abuts the front surface 60 of a respective one of the teeth 58 when the central disk 52 is rotated in a second direction such that the finger 64 inhibits the central disk 52 from rotating in the second direction. The central disk 52 in each of the ratchets 50 can be depressed into the outer disk 54 such that the finger 64 disengages from the teeth 58. In this way the central disk 52 can be rotated in the second direction.

The outer surface 56 of the central disk 52 has a recess 66 extending toward a center of the central disk 52, and the recess 66 is exposed with respect to the outer disk 54. Each of the ratchets 50 includes a door 68 that is pivotally coupled to the outer surface 56 of the central disk 52. The door 68 extends across the recess 66 when the door 68 is closed. Conversely, the door 68 exposes the recess 66 when the door 68 is opened.

A mixing bowl 70 is provided and a pouring spout 72 is integrated into the mixing bowl 70 to pour contents of the mixing bowl 70 outwardly from the pouring spout 72 when the mixing bowl 70 is tipped. The mixing bowl 70 may be a kitchen mixing bowl 70 with a diameter ranging between approximately 8.0 inches and 10.0 inches. A pair of arms 74 is each pivotally coupled to the mixing bowl 70 and each of the arms 74 engages the central disk 52 of a respective one of the ratchets 50. In this way the mixing bowl 70 is suspended between the pair of uprights 38 such that the mixing bowl 70 is accessible for mixing ingredients in the mixing bowl 70. The central disk 52 of each of the ratchets 50 rotates when the mixing bowl 70 is tipped thereby facilitating the pour spout to be directed downwardly. In this way the mixing bowl 70 can pour the ingredients without requiring a user to support the mixing bowl 70. Thus, a physically limited user, such as an elderly person or a person with a physical disability, can easily pour the ingredients from the mixing bowl 70.

Each of the arms 74 is pivotally coupled to an outside surface 76 of the mixing bowl 70 and the arms 74 are positioned on opposite sides of the mixing bowl 70 from each other. Each of the arms 74 is oriented perpendicular to the outside surface 76 when the arms 74 are in a deployed position. Additionally, each of the arms 74 rests in the recess 66 in the outer surface 56 of the central disk 52 of the respective ratchet 50 when the mixing bowl 70 is suspended between the pair of uprights 38. The pouring spout 72 is tipped downwardly when the central disk 52 in each of the ratchets 50 rotates in the first direction.

A pair of stops 78 is provided and each of the stops 78 is coupled to and extends away from a respective one of the arms 74. Each of the stops 78 is perpendicularly oriented with the respective arm 74. Moreover, each of the stops 78 abuts the outside surface 76 of the mixing bowl 70 when the arms 74 are positioned in the deployed position. In this way the arms 74 are inhibited from pivoting beyond the deployed position for supporting the weight of the mixing bowl 70.

In use, the second portion 22 of each of the legs 14 is locked into the extended position and each of the uprights 38 is locked into the deployed position. The mixing bowl 70 is positioned between the uprights 38 such that each of the arms 74 engages the respective ratchet 50. In this way the mixing bowl 70 is retained in an upright position to facilitate ingredients to be mixed in the mixing bowl 70. The mixing bowl 70 can be tipped forwardly to pour the ingredients from the pouring spout 72 and the ratchets 50 retain the mixing bowl 70 in the tipped position. In this way the user does not have to hold the mixing bowl 70 to pour the ingredients out of the mixing bowl 70.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mixing bowl tilting assembly for supporting a mixing bowl and tilting the mixing bowl for pouring, said assembly comprising:
    a support frame having a pair of legs each having a telescopically adjustable length wherein said support frame is configured to lie on a support surface;
    a plurality of feet, each of said feet being coupled to said support frame wherein each of said feet is configured to abut a support surface;
    a pair of uprights, each of said uprights being pivotally coupled to said support frame, each of said uprights being positionable in a deployed position having each of said uprights being vertically oriented on said support frame, each of said uprights being positionable in a stored position having each of said uprights being horizontally oriented on said support frame;
    a pair of ratchets, each of said ratchets being integrated into a respective one of said uprights, each of said ratchets having a central disk being sequentially rotatable in an outer disk;
    a mixing bowl having a pouring spout being integrated into said mixing bowl wherein said mixing bowl is configured to pour contents of said mixing bowl outwardly from said pouring spout when said mixing bowl is tipped; and
    a pair of arms, each of said arms being pivotally coupled to said bowl, each of said arms engaging said central disk of a respective one of said ratchets such that said mixing bowl is suspended between said pair of uprights wherein said mixing bowl is configured to be accessible for mixing ingredients in said mixing bowl, said central disk of each of said ratchets rotating when said mixing bowl is tipped thereby facilitating said pour spout to be directed downwardly wherein said mixing bowl is configured to pour the ingredients without requiring a user to support said mixing bowl.

2. The assembly according to claim 1, wherein:
    said support frame includes a member extending between a first portion of each of said legs, each of said legs including a second portion which slidably engages said first portion for facilitating said telescopically adjustable length, each of said legs having a bottom surface and a top surface;
    said assembly includes a pair of legs locks, each of said leg locks being movably integrated into said second portion of a respective one of said legs, each of said leg locks being biased outwardly from said second portion of said respective leg, each of said leg locks extending outwardly through a hole in said first portion of said respective leg for retaining said second portion in an extended position, each of said leg locks being depressible to disengage said hole to facilitate said second portion to be retracted into said first portion; and
    said assembly includes a pair of hinges, each of said hinges being coupled to and extending upwardly from said top surface of a respective one of said legs, each of said hinges being positioned on said first portion of said respective leg adjacent to an intersection with said second portion of said respective leg, each of said hinges having a pair of hinge points being spaced apart from each other.

3. The assembly according to claim 2, wherein:
    each of said uprights has a top end, a bottom end and a first surface extending between said top end and said bottom end, said bottom end being positioned in a respective one of said hinges, each of said hinge points on said respective hinge pivotally engaging said upright being positioned in said respective hinge, said first surface of each of said uprights being directed toward each other when said uprights are in said deployed position; and
    said assembly includes a pair of upright locks, each of said upright locks being movably integrated into a respective one of said uprights, each of said upright locks being biased outwardly from said respective upright, each of said upright locks extending through a hole in a respective one of said hinges for retaining said uprights in said deployed position, each of said upright locks being depressible to disengage said hole in said respective hinge for moving said uprights into said stored position.

4. The assembly according to claim 1, wherein said outer disk of each of said ratchets lies flat on a first surface of a respective one of said uprights having said central disk being directed away from said first surface, said central disk having an outer surface, said outer surface having a plurality of teeth each extending outwardly from said outer surface, said teeth being spaced apart from each other and being distributed around said outer surface, said teeth being positioned inside of said outer disk, said teeth having a front surface being oriented perpendicular to said outer surface of said central disk, each of said teeth having a top surface sloping between said front surface and said outer surface of said central disk, said outer surface of said central disk has a recess extending toward a center of said central disk, said recess being exposed with respect to said outer disk.

5. The assembly according to claim 4, wherein each of said ratchets includes a finger being pivotally disposed within said outer disk, said finger sliding along said top surface of each of said teeth when said central disk is rotated in a first direction, said finger abutting said front surface of a respective one of said teeth when said central disk is rotated in a second direction such that said finger inhibits said central disk from rotating in said second direction.

6. The assembly according to claim 4, wherein each of said ratchets includes a door being pivotally coupled to said outer surface of said central disk, said door extending across said recess when said door is closed, said door exposing said recess when said door is opened.

7. The assembly according to claim 4, wherein each of said arms is pivotally coupled to an outside surface of said mixing bowl, said arms being positioned on opposite sides of said mixing bowl from each other, each of said arms being oriented perpendicular to said outside surface when said arms are in a deployed position, each of said arms resting in said recess in said outer surface of said central disk of said respective ratchet when said mixing bowl is suspended between said pair of uprights, said pour spout being tipped downwardly when said central disk in each of said ratchets rotates in a first direction.

8. The assembly according to claim 7, further comprising a pair of stops, each of said stops being coupled to and extending away from a respective one of said arms, each of said stops being perpendicularly oriented with said respective arm, each of said stops abutting said outside surface of said mixing bowl when said arms are positioned in said deployed position thereby inhibiting said arms from pivoting beyond said deployed position for supporting the weight of said mixing bowl.

9. A mixing bowl tilting assembly for supporting a mixing bowl and tilting the mixing bowl for pouring, said assembly comprising:
  a support frame having a pair of legs each having a telescopically adjustable length wherein said support frame is configured to lie on a support surface, said support frame including a member extending between a first portion of each of said legs, each of said legs including a second portion which slidably engages said first portion for facilitating said telescopically adjustable length, each of said legs having a bottom surface and a top surface;
  a plurality of feet, each of said feet being coupled to said support frame wherein each of said feet is configured to abut a support surface, each of said feet being concavely arcuate such that each of said feet defines a bowl, each of said feet being comprised of a deformable material thereby facilitating each of said feet to be compressed against the support surface wherein each of said feet is configured to suctionally engage the support surface, each of said feet being positioned on said bottom surface of a respective one of said legs;
  a pair of legs locks, each of said leg locks being movably integrated into said second portion of a respective one of said legs, each of said leg locks being biased outwardly from said second portion of said respective leg, each of said leg locks extending outwardly through a hole in said first portion of said respective leg for retaining said second portion in an extended position, each of said leg locks being depressible to disengage said hole to facilitate said second portion to be retracted into said first portion;
  a pair of hinges, each of said hinges being coupled to and extending upwardly from said top surface of a respective one of said legs, each of said hinges being positioned on said first portion of said respective leg adjacent to an intersection with said second portion of said respective leg, each of said hinges having a pair of hinge points being spaced apart from each other;
  a pair of uprights, each of said uprights being pivotally coupled to said support frame, each of said uprights being positionable in a deployed position having each of said uprights being vertically oriented on said support frame, each of said uprights being positionable in a stored position having each of said uprights being horizontally oriented on said support frame, each of said uprights having a top end, a bottom end and a first surface extending between said top end and said bottom end, said bottom end being positioned in a respective one of said hinges, each of said hinge points on said respective hinge pivotally engaging said upright being positioned in said respective hinge, said first surface of each of said uprights being directed toward each other when said uprights are in said deployed position;
  a pair of upright locks, each of said upright locks being movably integrated into a respective one of said uprights, each of said upright locks being biased outwardly from said respective upright, each of said upright locks extending through a hole in a respective one of said hinges for retaining said uprights in said deployed position, each of said upright locks being depressible to disengage said hole in said respective hinge for moving said uprights into said stored position;
  a pair of ratchets, each of said ratchets being integrated into a respective one of said uprights, each of said ratchets having a central disk being sequentially rotatable in an outer disk, said outer disk of each of said ratchets lying flat on said first surface of a respective one of said uprights having said central disk being directed away from said first surface, said central disk having an outer surface, said outer surface having a plurality of teeth each extending outwardly from said outer surface, said teeth being spaced apart from each other and being distributed around said outer surface, said teeth being positioned inside of said outer disk, said teeth having a front surface being oriented perpendicular to said outer surface of said central disk, each of said teeth having a top surface sloping between said front surface and said outer surface of said central disk, said outer surface of said central disk having a recess extending toward a center of said central disk, said recess being exposed with respect to said outer disk, each of said ratchets including a finger being pivotally disposed within said outer disk, said finger sliding along said top surface of each of said teeth when said central disk is rotated in a first direction, said finger abutting said front surface of a respective one of said teeth when said central disk is rotated in a second direction such that said finger inhibits said central disk from rotating in said second direction, each of said ratchets including a door being pivotally coupled to said outer surface of said central disk, said door extending across said recess when said door is closed, said door exposing said recess when said door is opened;
  a mixing bowl having a pouring spout being integrated into said mixing bowl wherein said mixing bowl is configured to pour contents of said mixing bowl outwardly from said pouring spout when said mixing bowl is tipped;
  a pair of arms, each of said arms being pivotally coupled to said bowl, each of said arms engaging said central disk of a respective one of said ratchets such that said mixing bowl is suspended between said pair of uprights wherein said mixing bowl is configured to be accessible for mixing ingredients in said mixing bowl, said central disk of each of said ratchets rotating when said mixing bowl is tipped thereby facilitating said pour spout to be directed downwardly wherein said mixing bowl is configured to pour the ingredients without requiring a user to support said mixing bowl, each of said arms being pivotally coupled to an outside surface of said mixing bowl, said arms being positioned on opposite sides of said mixing bowl from each other, each of said arms being oriented perpendicular to said outside surface when said arms are in a deployed position, each of said arms resting in said recess in said outer surface of said central disk of said respective ratchet when said bowl is suspended between said pair of uprights, said pour spout being tipped downwardly when said central disk in each of said ratchets rotates in said first direction; and a pair of stops, each of said stops being coupled to and extending away from a respective one of said arms, each of said stops being perpendicularly oriented with said respective arm, each of said stops abutting said outside surface of said mixing bowl when said arms are positioned in said deployed position thereby inhibiting said arms from pivoting beyond said deployed position for supporting the weight of said mixing bowl.

* * * * *